Dec. 25, 1945.   A. B. RICHARDS ET AL   2,391,515
INSULATION
Filed March 29, 1943   2 Sheets-Sheet 1

A. B. Richards
H. S. Atherton
INVENTORS.
BY
ATTORNEYS.

Dec. 25, 1945.    A. B. RICHARDS ET AL    2,391,515
INSULATION
Filed March 29, 1943    2 Sheets-Sheet 2
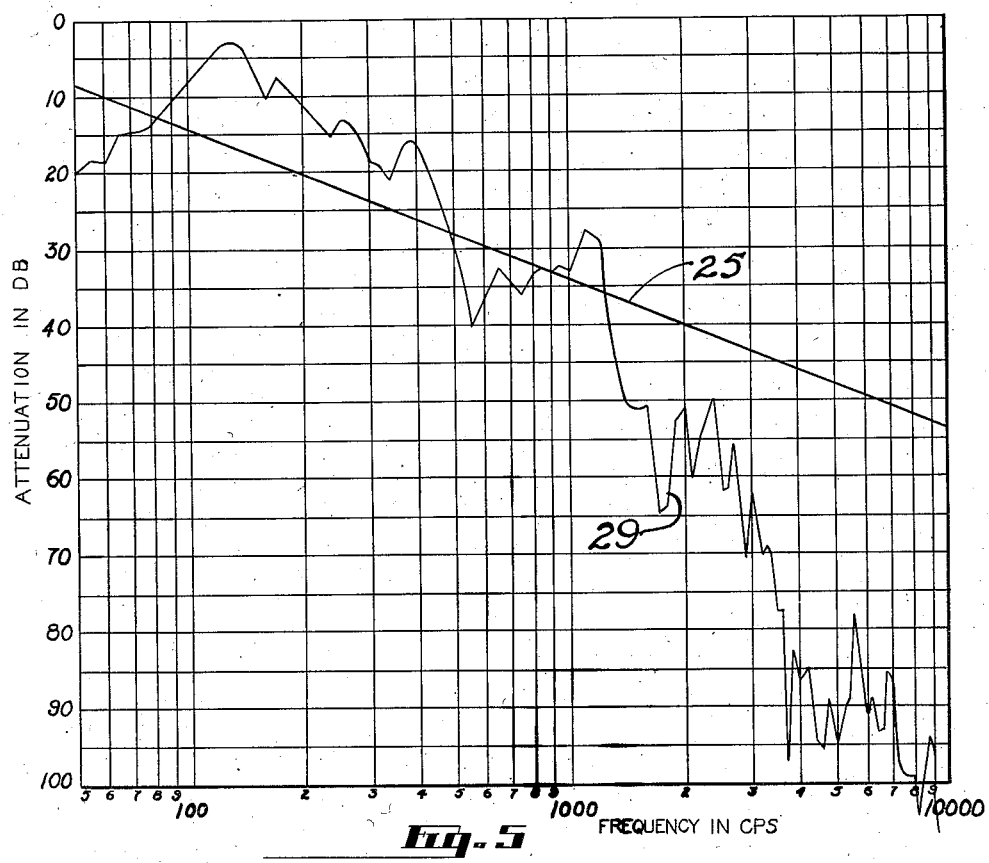
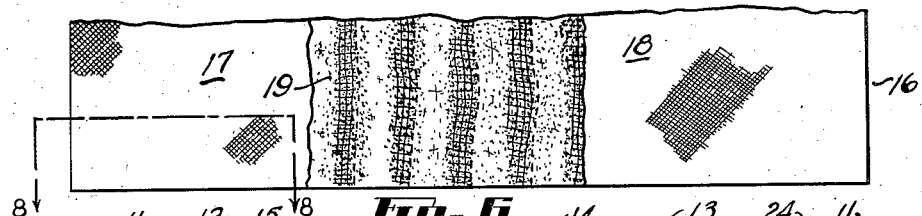
A. B. Richards
H. S. Atherton
INVENTORS.

Patented Dec. 25, 1945

2,391,515

UNITED STATES PATENT OFFICE 2,391,515

INSULATION

Alvin B. Richards, Dearborn, and Harold S. Atherton, Detroit, Mich., assignors to Ford Motor Company, Dearborn, Mich., a corporation of Delaware Application March 29, 1943, Serial No. 480,995

3 Claims. (Cl. 154—28)

This invention relates to the soundproofing of vehicles by insulation; and, more particularly, insulation of airframe structures in which the weight of the soundproofing material required is an item of considerable moment.

While all materials, metallic or nonmetallic, will prevent transmission of sound at least in proportion to their weight, the last factor becomes of considerable importance when the soundproofing of aircraft is considered. It, therefore, becomes necessary to evolve combinations for materials which will exceed the theoretical weight law so far as nontransmission is concerned. It is apparent that by using a sufficient mass of material, a virtually complete nontransmission would be obtainable, but at the same time the weight of the structure would be increased considerably. It is, therefore, desirable to evolve a construction which gives a maximum soundproofing effect with the minimum compatible weight. At the same time, the damping of vibrations is a factor as well as the prevention of noise transmission and any suitable structure must be designed with these two considerations in mind.

The materials available for use are well known and their individual efficiency has been determined experimentally. Similarly, certain combinations of these materials, particularly chosen for one quality or another, are in use at the present time in aircraft. However, giving all due consideration to the weight of the materials used, the efficiency obtained to date has not been satisfactory.

It is, therefore, an object of this invention to devise a method of insulation which, on a comparative weight basis, gives results far exceeding, both as to vibration damping and sound transmission, any soundproofing heretofore available.

Another object of the invention is to devise a method of assembling insulating material which contributes, in large part, to increase the soundproofing advantage of the particular material. Yet another object is to devise a soundproofing structure which for its weight far exceeds in efficiency those heretofore used.

Before proceeding with a specific description of an invention, it will be well to consider the methods of rating employed to determine efficiency. As noted above, the theoretical value of a given soundproofing can be computed as a function of its weight and a straight line attenuation curve plotted against logarithmic sound frequencies. Then tests may be run at selected frequencies to determine the actual attenuation characteristics of the particular sample and the results plotted against the theoretical weight line. This gives a very clear comparison of sound attenuation both as between various samples and between these samples and the theoretical weight law characteristic. Other tests have been developed to determine the comparative damping of vibration on the basis of what is known as the thick plate rating. In this procedure, the unit of measure is the number of seconds required to disseminate a sound of predetermined characteristics in a thick steel plate to which the insulation has been secured; and, as an illustration, five seconds or less may be considered as a satisfactory figure, while materials having inferior damping characteristics may range well above 100 seconds. The actual mechanics of these tests form no part of the invention but the techniques employed are known to workers in the art. Therefore, in considering the advantages of various common treatments, reference will be had principally to the attenuation expressed in decibels and the thick plate ratings as determined by the number applied. From these may be deduced a theoretical efficiency covering both characteristics and serving as an over-all comparison between different materials.

With these and other objects in view, the invention consists in the arrangement, construction and combination of the various parts of the improved device and the steps of the method followed therein, as described in the specification, claimed in the claims, and illustrated in the accompanying drawings in which:

Fig. 5 is an illustrative attenuation curve as determined for the particular construction chosen.

Figs. 6 and 7 are plan views of the curtain and skin insulation, respectively, successive layers thereof being broken away from left to right.

Fig. 8 is the transverse section through the curtain and skin insulation taken as indicated in the line 8—8 of Figs. 6 and 7 and showing the insulating elements in assembled relation.

Figure 1:
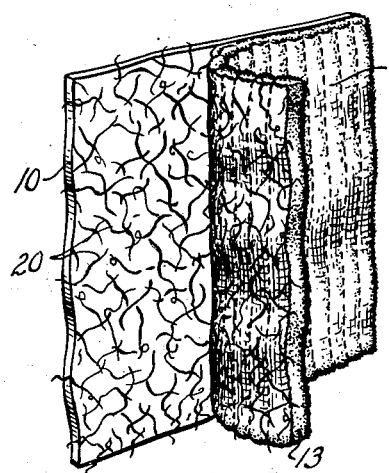
Fig. 1 is a perspective view of a method of attaching a fiber batt or pad to the interior of an aircraft fuselage skin.

Referring first to Figs. 5, 6 and 8, the reference character 10 indicates the metal fuselage skin and 11 the metal longerous or stringers to which the skin 10 is attached. In contact with the inner surface of the skin 10 and substantially the same depth as the stringers 11, is the skin insulation generally designated as 12 which comprises a batt or pad 13 adhesively secured to the skin 10, an intervening septum 14 and an inner batt 15. Suitably suspended inwardly of the skin insulation 12 is the curtain insulation 16 which comprises inner and outer fabric cloth covers 17 and 18 and the certain batt 19.

Figure 2:
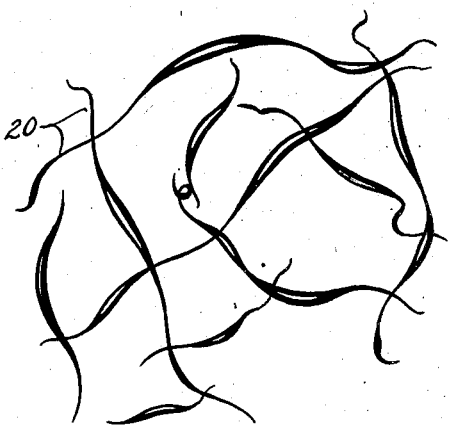
Fig. 2 shows the random pattern of adhesive customarily used in attaching the batt to the skin.
Figure 3:
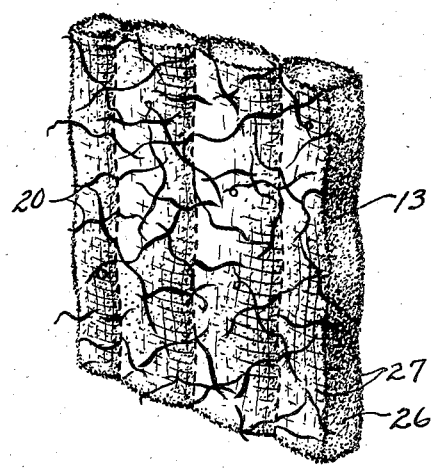
Fig. 3 is a perspective view showing the application of adhesive to the batt with the use of veiling spray gun.
Figure 4:
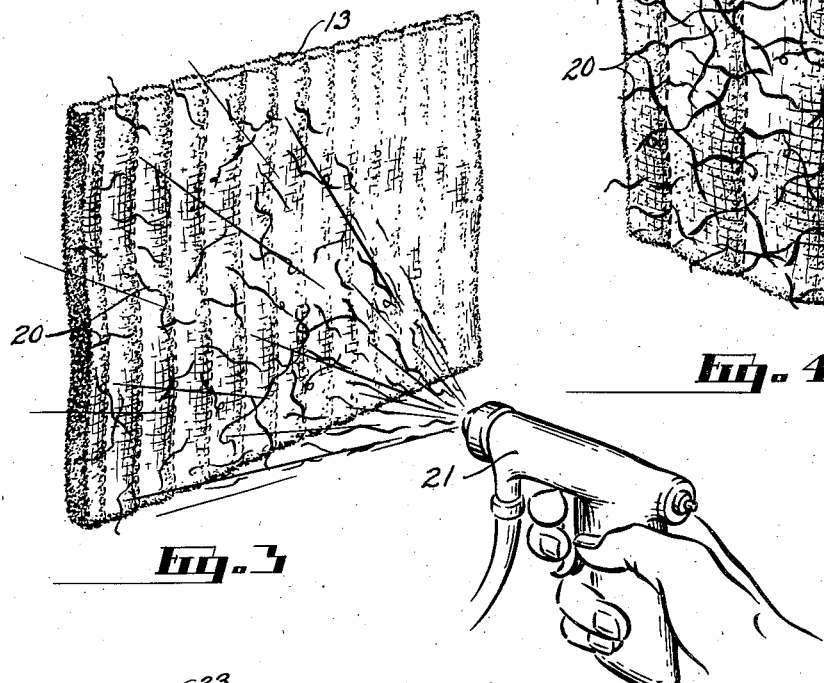
Fig. 4 is a perspective view of the batt showing adhesive adhering thereto.

Figs. 1 through 4 show the preferred method of attaching the skin batt 13 to the metallic skin 10 by the use of randomly distributed adhesive material 20. This is applied either to the skin's inner surface, as indicated in Fig. 1, or to the surface of the batt, as shown in Fig. 3, with a spray gun 21 having a "veiling" attachment by means of which the adhesive material or cement is broken up and projected in the form of short discontinuous strings, as shown in Fig. 2, which gives a reticulated or random net-like zone of attachment between the contacting surfaces of the skin batt and skin. The relative proportions of the adhesive and nonadhesive zones are shown in these figures and for best results, the proportion should be in the neighborhood of 10 to 20 per cent and the weight of the cement should not exceed 40 per cent of the weight of the continuous coating usually used in securing insulating batts. After the cement, usually rubber base or like material, is sprayed on the batt or skin as may be most convenient, these elements are brought into position and lightly pressed together, which is sufficient to complete the cement bond therebetween.

Figure 9:
Fig. 9 is a transverse section on an enlarged scale of the corrugated septum employed in the skin insulation.

The septum 14 is then fitted between the stringers 11 and adhesively secured at intervals to the inner surface 22 of the skin batt 13. As shown in Fig. 9, the septum 14 is formed from corrugated paper, the cement by which it is secured to the batts on either side being applied as at 23 along the extending apices of the corrugations. This insures the maintenance of spaced voids between the batt and septum, yet limits the extent of these voids uniformly throughout the structure. As will be observed in Fig. 7, the corrugations run transversely of the stringers to prevent sagging of the skin insulation. The inner batt 15 is similarly secured to the outer surface of the septum to complete the skin insulation.

The curtain insulation 16 is suspended inwardly of the skin insulation 12 and in the present example, has its outer surface 28 spaced about two and one-half inches from the skin 10. The preferred construction has the outer cover 18 made of aluminum-coated cloth and the inner cover 17 of trim cloth enclosing the batt 19. While the curtain assembly may, in some instances, be omitted, its contribution to soundproof efficiency is considerable and in addition it performs the function of trimming the interior of the ship.

The batts used in the various assemblies may be formed from a number of materials such as kapok (which is sold under a number of proprietary names and in different forms), rock wool, cotton, felt, and other materials. The present experiments indicate that kapok filling 26 between the quilted gauze sheets 27 (Fig. 4) is to be preferred on the grounds of efficiency, durability, and economy.

A variation of the manner of attachment of the skin batt 13 to the skin 10 is shown in Fig. 7. In place of applying the cement with a veiling gun, it may be applied in spaced strips 24 between the elements. In other respects, the construction, proportions and weight ratios are similar to those resulting from use of the sprayed cement and the insulation characteristics are comparable.

In essence, the construction embodies the following distinctive characteristics: First, the skin insulation is secured to the skin only at spaced or randomly applied adhesive zones leaving comparatively large areas free of adhesive; and, second, a septum is interposed between two batts comprising a skin insulation assembly, the septum being corrugated in form and being intermittently attached to the batts on either face, leaving a large portion of adjoining areas free of actual contact. When these two conditions are met, attenuation and damping characteristics are obtained far superior to those ordinarily expected from other materials of the same weight or, indeed, of the same physical structure otherwise applied. As an example of this, Fig. 5 shows a typical attenuation curve in which the ordinate shows the sound attenuation through the sample in decibels at the various sound frequencies indicated by the abscissa. The straight line 25 indicates the computed weight law attenuation and the irregular line 29 the actual attenuation as observed in tests. It is desirable, of course, that the attenuation lines be as near the bottom of the graph as possible; and, if the actual value of the sample is to exceed the theoretic, the line 29 must be beneath the line 25. In the present instance, it will be noted that at frequencies above a thousand cycles per second (and it is in this range which soundproofing is particularly to be desired) the actual test results far surpass those predicted by the weight law. Moreover, they also surpass those of other assemblies of light weight subjected to the same conditions of tests. The weight of the assembly shown is approximately .338 pound per square foot and when the area to be soundproofed is considered, it is at once apparent that attenuation efficiency as opposed to added weight is to be obtained if at all possible. In this respect the present method of soundproofing is particularly advantageous since it is not only most effective with sounds of higher frequencies but the weight required for desired attenuation is reduced accordingly. Even more striking is the improved thick plate rating obtainable with this type of construction, varying from 3 to 5. This is to be compared with the conventional soundproofing assemblies in which the ratings are as high as 250.

Some changes may be made in the various elements of this invention and steps in the method of use thereof without departing from the spirit of the invention and it is the intention to claim such changes as may reasonably be included within the scope thereof.

The invention claimed is:

1. A laminated soundproofing assembly designed to be used in connection with a thin vibratile structural plate, comprising a batt of soft loose fibrous material secured between textile webs having one surface adhesively secured to the inner surface of said plate, an impervious septum having one surface adhesively secured to the other surface of said batt, and a second batt secured to the other face of said septum, the adhesive between said plate and said first batt being randomly distributed at spaced reticulated intervals therebetween in thin vermicular filaments.

2. The method of applying soundproofing material in batt form to thin structural plates which comprises applying adhesive on one of the surfaces of contact between said plate and said batt of insulating material, distributing said adhesive in a random fashion thereon by spray projecting it in thin vermicular filaments, limiting the area of said adhesive to an amount substantially less than the adjoining area of said components, which is free from said adhesive, and bringing said components into contact to secure them together.

3. A laminated soundproofing assembly to be used in conjunction with a thin vibratile structural plate, comprising, a batt of soft loose fibrous material secured between textile webs having one face adhesively secured to the inner surface of said plate, said adhesive so securing said batt and said plate together being distributed therebetween in thin vermicular filaments randomly disposed to form irregularly reticulated adhesive areas.

ALVIN B. RICHARDS.
HAROLD S. ATHERTON.